May 2, 1961
L. A. MILLER
2,982,778
MANUFACTURE OF TETRAETHYLLEAD
Filed Feb. 3, 1958
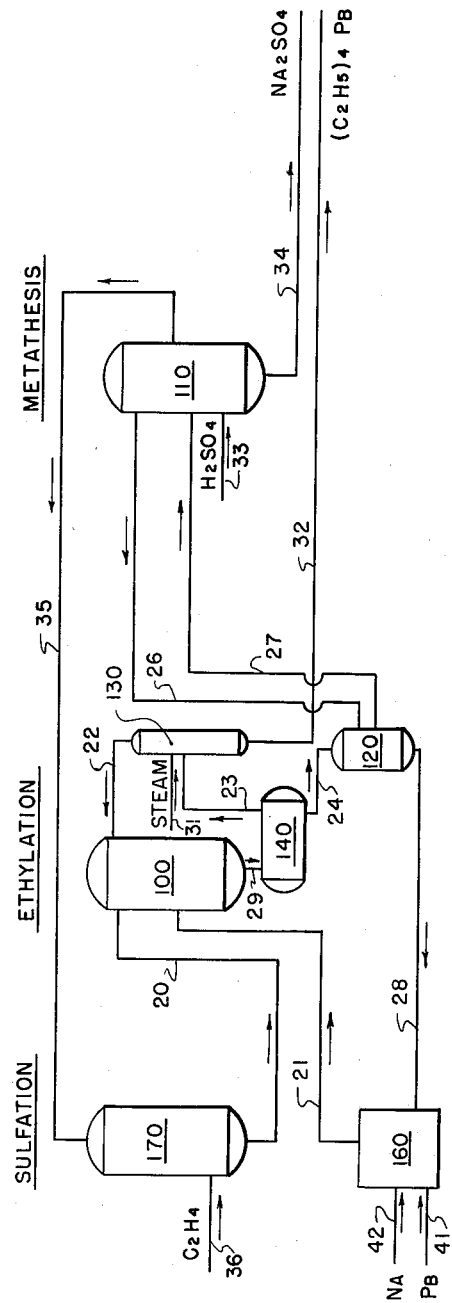

United States Patent Office 2,982,778
Patented May 2, 1961

2,982,778
MANUFACTURE OF TETRAETHYLLEAD
Leo A. Miller, Baton Rouge, La., assignor to Ethyl Corporation, New York, N.Y., a corporation of Delaware
Filed Feb. 3, 1958, Ser. No. 712,794
5 Claims. (Cl. 260—437)

This invention relates to the manufacture of organolead compounds. More particularly, the invention relates to an improved and more economical synthesis of tetraalkyllead compounds, particularly tetraethyllead.

Tetraethyllead is conventionally made by the reaction of monosodium lead alloy (10 weight percent sodium and 90 weight percent lead) with ethyl chloride. The product of the reaction of these materials is a heterogeneous mixture including a substantial quantity of excess or unreacted lead, sodium chloride, and relatively minor amounts of tetraethyllead (based on the weight fraction present). This reaction mixture, or reaction mass, is immersed in water, and the tetraethyllead product is removed by steam distillation. This operation concurrently leaches out most of the salt content of the mass. Because the salt solution so-produced is very dilute, the stream is conventionally ditched, thus resulting in an irrevocable loss of sodium chloride. The excess lead is separated from the other components and resmelted.

Even under the foregoing circumstances, the above described reaction has enjoyed great commercial success. Nevertheless, considerable potential savings would be achieved by the ability to produce a conjoint product with the tetraethyllead, and also by the ability to employ a more economical source of the ethyl groups required for the synthesis. One theoretically possible route providing such advantages would be to react diethyl sulfate and sodium lead alloy, as is proposed by Sullivan patent, U.S. 1,611,695. Unfortunately, tests of the Sullivan process show that only a portion of the ethyl groups available are reacted, so that the overall efficiency of the Sullivan process is not as great as the conventional process described above. In other words, in practice the potential advantage of the Sullivan process is not realized, especially in that the available ethyl groups are utilized only in part. Accordingly, no particularly effective process has been found heretofore which fully circumvents the need for using ethyl chloride as an ethylating liquid.

An object of the present invention is, therefore, to provide a new and improved process for the production of tetraethyllead. More particularly, an object is to provide a process for the synthesis of tetraethyllead wherein ethylene is fed directly to the process. An additional object is to provide a process which circumvents the limitation inherent in the prior art, viz., that only one of the ethyl groups, fixed in making diethyl sulfate, is readily utilized in formation of tetraethyllead. Even more specifically, an object of the invention is to provide a process wherein sodium sulfate is produced and is readily recoverable as a joint product with the tetraethyllead. Other objects will appear hereinafter.

The figure shows a simplified schematic diagram of the process of the invention. For convenience the process, though completely integrated, and readily susceptible of continuous operation, is referred to in three separate stages, described below.

In its most general form, the process involves several integrated steps, viz., first, the "fixation" of ethylene by absorption, or by sulfation with a recycle stream, hereafter defined, to form a liquid including diethyl sulfate; secondly, the ethylation of lead provided in the form of sodium lead alloy; and third, a metathesis stage wherein a portion of the reaction mixture from the ethylation stage (after removal of tetraethyllead) is treated to provide recoverable sodium sulfate and a stream for recycling to the sulfation stage. The ethylation stage is followed by recovery of the tetraethyllead formed therein, as indicated above.

In the sulfation stage ethylene is reacted with the recycle stream of ethyl hydrogen sulfate to generate diethyl sulfate. Generally, it has been found desirable to contact the reactants at a temperature between about 100° C. to about 150° C. and between a pressure of from about 150 pounds per square inch to about 250 pounds per square inch. This is the only stage of the entire process wherein supra atmospheric pressure is generally employed. The indicated pressure ranges, are, however, surprisingly, only about one-half the pressure normally considered essential to "fix" ethylene as diethyl sulfate. By reacting ethylene with an already half ethylated compound to produce a more fully ethylated stream comprising diethyl sulfate, this extremely important advantage is obtained.

The components fed for start up to the ethylation stage include sodium-lead alloy, the diethyl sulfate stream from the sulfation stage, and a solvent for the tetraethyllead which is inert at reaction conditions. The ethylation reaction is carried out at moderate pressures, atmospheric if desired, and at moderate temperatures, for example at 70° to 80° C. The reaction and product mixture is a heterogeneous system including solid sodium ethyl sulfate, metallic lead, and a solution of tetraethyllead in hexane. This slurry is transferred to a settling operation. The solids are settled and the supernatant solution is drawn off and delivered to a distillation column, where separation of the tetraethyllead product takes place, the solvent being recycled to the settling step. The residue is then sent to a second extraction operation, wherein the sodium ethyl sulfate compound is separated from the lead solids by leaching with an ethanol stream obtained from the following or metathesis reaction operation. The sodium ethyl sulfate is thus leached away from the lead solids, which are passed to a smelting operation for recovery and realloying with sodium to form alloy for the ethylation stage.

In the third or metathesis stage, sulfuric acid is reacted with the sodium ethyl sulfate from the extractor, provided in ethanol solution. This converts the sodium ethyl sulfate to ethyl hydrogen sulfate and sodium sulfate. Generally, it is desirable to contact the reactants at a temperature of from about 110° C. to about 130° C. An excess of sulfuric acid is normally provided, and the product of the reaction is a solution of ethyl hydrogen sulfate in sulfuric acid. In addition, solid sodium sulfate is generated and the ethanol solvent is denuded, at least in part of its original sodium ethyl sulfate content.

The invention will be further understood by referring to the following detailed description of the process and to the flow diagram which illustrates a typical embodiment of this invention. The identity and function of the several units of apparatus schematically shown in the figure will be readily apparent from the description below. It is also seen from the foregoing outline that a vital feature for efficiency of the overall process is the separation and recovery operations. These are associated with the individual stages, as described below, but further serve to place certain of the process streams in particularly fit condition for reaction in the other stages.

SULFATION OPERATION

A fresh ethylene stream is introduced through a feed line 36 into an absorber-reactor 170 where it contacts the recycled liquid stream comprising ethyl hydrogen sulfate from a reactor 110 in which the reaction of the final or metathesis operation is carried out. The reaction involves the addition of ethylene to ethyl hydrogen sulfate, as generally represented by the following equation:

$$C_2H_4 + C_2H_5HSO_4 \rightarrow (C_2H_5)_2SO_4$$

The diethyl sulfate-containing stream so-formed is then conveyed through a transfer line 20 to a reactor 100 for the reaction of the ethylation stage.

ETHYLATION OPERATION

An ethylator 100 receives the diethyl sulfate stream transferred through line 20 from the sulfation stage. Also fed to the ethylation reactor 100 is a selective solvent for tetraethyllead which is inert at reaction conditions. Liquid alkane hydrocarbons are particularly suitable for this purpose, hexane being a particularly suitable example. Agitation of the charge is started. Sodium lead alloy in the form of thin flakes or in molten form is then charged to the ethylation reactor 100 through line 21. The reaction proceeds accordings to the following:

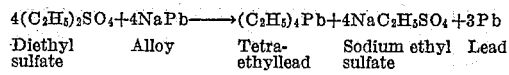

| Diethyl sulfate | Alloy | Tetra-ethyllead | Sodium ethyl sulfate | Lead |

It is seen that the reaction system will be a relatively thin slurry of solids (lead and sodium ethyl sulfate). When the reaction is well under way, having an average composition usually approaching 90 percent completion, discharge of the slurry is started, through line 29 to a settler-extractor 140. Concurrently, the feeds of the reactants and solvent are adjusted to maintain constant the depth of the liquid in the ethylator 100. In the settler-extractor 140 a lower solids rich portion is formed, surmounted by a supernatant liquid layer comprising solvent, tetraethyllead, and minor amounts of ethyl sulfate. The liquid layer is transferred to a recovery column 130, whereas the major amount of solvent is distilled overhead, and returned through a solvent line 22, usually after condensation, to the ethylation reactor 100. The recovery column operation may be a vacuum distillation, but more frequently is a partial pressure operation, such as a steam distillation. The solids bottom layer from the settler-extractor 140, consisting principally of sodium ethyl sulfate and lead, is discharged to a second extractor 120. Small amounts of unreacted sodium lead alloy may also be present. The solids are introduced into the top of the extractor 120 through line 24. Ethanol from a metathesis reactor 110 is introduced near the bottom of the extractor 120 through line 26. The ethanol dissolves out the sodium ethyl sulfate of the residue or sludge and the resulting solution is carried to the metathesis stage reactor 110 through line 27. The remaining solids from the extractor 120, consisting predominantly of lead, and small amounts of unreacted sodium lead alloy, is passed to a lead recovery operation 160 through line 28. In the lead recovery-realloying section, the lead solids are dried, smelted, and combined with additional lead and sodium to provide alloy for the process. Steam is introduced into the distillation column 130 through line 31. Hexane and steam are taken off overhead, and the two liquids separated by a simple settling technique, hexane and water being immiscible liquids. The hexane is then recycled to the ethylator 100 through line 22. The tetraethyllead is removed from the bottom of the distillation column 130 and sent to storage through line 32.

METATHESIS OPERATION

Sodium ethyl sulfate dissolved in ethanol is introduced in the reactor 110 through line 27. Simultaneously concentrated sulfuric acid or oleum is introduced therein through line 33. The products of the reaction are sodium sulfate and ethyl hydrogen sulfate. The reaction is represented by the following equation:

$$2NaC_2H_5SO_4 + H_2SO_4 \rightarrow 2C_2H_5HSO_4 + Na_2SO_4$$

| Sodium ethyl sulfate | Sulfuric acid | Ethyl hydrogen sulfate | Sodium sulfate |

The components of a reacted mixture are separated, the sodium sulfate solids being thus a joint product for sale or use in known manner. The ethanol stream is returned to the extraction operation following the ethylation operation for selective separation of sodium ethyl sulfate. The ethyl hydrogen sulfate, plus sulfuric acid stream is forwarded to the initial or sulfation operation.

Typically, the sodium sulfate solids are filtered from the ethyl hydrogen sulfate, washed with hexane and sent to storage through line 34. The ethyl hydrogen sulfate and some unreacted sulfuric acid are recycled through line 35 to the absorber-reactor 170 of the sulfation stage. Ethanol is distilled from the reactor 110 and recycled through line 26 to the extractor 120.

In addition to continuous flow operations as generally described in the foregoing, the several steps of the process are fully susceptible to batch operation, as described in Example I, following.

Example I 3170 pounds of monosodium-lead alloy, 2120 pounds of diethyl sulfate and 6000 pounds of hexane are introduced into the ethylator 100. The reactor is then sealed. The hexane moderates the heat of reaction, and allows the reaction to proceed at a temperature of 83° C. After 4 hours, the ethylator 100 is cooled and vented. The contents are discharged, as a slurry, to the settler-extractor 140. The supernatant liquid, which consists of a solution of tetraethyllead in hexane is passed to the still 130 where it is distilled with steam under a pressure of 5 pounds per square inch gauge. The hexane after settling out the water is recycled to the ethylator 100. The bottoms are drawn off to a settling tank, where the supernatant water is drawn off, and the TEL is sent to storage. A tetraethyllead yield approaching 1000 pounds will be provided.

The residue from the settler-extractor 140 is conveyed to the extractor 120, where it is treated with 2250 pounds of ethanol at 50° C. and atmospheric pressure to dissolve out the sodium ethyl sulfate. The 1936 pounds of residual lead is then dried, and delivered to the alloy kettle, where it is combined with 215 pounds of sodium to produce fresh alloy for the ethylation.

The ethanol solution of the sodium ethyl sulfate is delivered to the reactor 110 where it is treated with 670 pounds of 99 percent sulfuric acid at 120° C. and at atmospheric pressure. The sodium ethyl sulfate is thereby converted to ethyl hydrogen sulfate, which is delivered to the absorber reactor 170. The sodium sulfate, weighing 880 pounds is separated therefrom with hexane, dried and sent to storage.

410 pounds of ethylene gas is admitted to the absorber 170 where it is sulfated at 100° C. and at a pressure of 200 pounds per square inch, reacting with the ethyl hydrogen sulfate-sulfuric acid solution from the reactor 110. The diethyl sulfate-containing stream produced is delivered to the ethylator 100 for reaction with fresh sodium lead alloy.

The following example is the same as the foregoing example except with respect to the solvents employed in the ethylation stage.

Example II

Example I is repeated except that benzene is used to moderate heat of reaction and to dissolve out the tetraethyllead which is formed in the ethylation reaction.

The temperature of the ethylation reaction is closely controlled at 77° C.

Following the removal of the tetraethyllead from the reaction mixture ethyl hydrogen sulfate is used to dissolve out the sodium ethyl sulfate which is also produced during the ethylation. The resulting solution is then sent directly to the reactor 110. Sulfur trioxide is then added to the reactor 110 and the sodium ethyl sulfate is further sulfated to the diethyl sulfate.

The following example describes the process as a continuous operation.

*Example III*

2180 pounds of monosodium-lead alloy, 1415 pounds of diethyl sulfate, and 4000 pounds of hexane are introduced into the ethylator 100 which is then sealed and the heat moderated at 80° C. for 2 hours. At the end of that time the contents of the ethylator 100 are discharged, as a slurry, to the settler-extractor 140 at a rate of 1900 pounds per hour. 354 pounds per hour of diethyl sulfate and 545 pounds per hour of sodium-lead alloy are introduced into the ethylator 100. Hexane is introduced into the ethylator 100 at a rate of 1000 pounds per hour. Under these conditions the liquid level within the ethylator 100 remains constant while reaction continues. The supernatant liquid after settling, which consists of a solution of tetraethyllead in hexane, is passed to the still 130 from the settler-extractor 140 at a rate of 1167 pounds per hour where it is distilled with steam under a pressure of 5 pounds per square inch. Tetraethyllead will be produced at a rate of over about 150 pounds per hour.

The residue from the settler-extractor 140 goes to extractor 120, where it is treated with 375 pounds per hour of alcohol at 35° C. and atmospheric pressure to dissolve out the sodium ethyl sulfate. 324 pounds per hour of residual lead plus some unreacted sodium-lead alloy is delivered to the alloy kettle, where it is combined with 37 pounds per hour of sodium to reproduce fresh alloy for the operation.

The ethanol solution of the sodium-ethyl sulfate is delivered to the reactor 110, where it is treated with 112 pounds per hour of 99 percent sulfuric acid at 120° C. and atmospheric pressure. The sodium ethyl sulfate is thereby converted to ethyl hydrogen sulfate, which is delivered to the absorber reactor 170. Sodium sulfate is produced at a rate of 144 pounds per hour and is washed and sent to storage.

Ethylene gas at the rate of 68 pounds per hour is admitted to the absorber reactor 170 where it is sulfated at 175° C. and 225 pounds per square inch by the ethyl hydrogen sulfate-sulfuric acid solution from the reactor 110. The resulting diethyl sulfate is delivered to the ethylator 100 at a rate of 352 pounds per hour.

The following example describes the same operation as Example III above except with respect to the solvents employed in the ethylation stage.

*Example IV*

This example is the same as the foregoing example except that a mixed solvent, 50 percent by weight isooctane and 50 percent by weight benzene, is used to moderate the heat of reaction in the ethylation stage and to extract the tetraethyllead component from the reaction mixture. The temperature of the ethylation reaction is controlled at 83° C.

Following the removal of the tetraethyllead from the reaction mixture by the said mixed solvent, ethyl chloride is used to dissolve the sodium ethyl sulfate from the residue. The ethyl chloride is then easily removed by distillation and the sodium ethyl sulfate sent to the reactor 110 for further reaction with sulfuric acid or oleum.

Generally, the reaction between ethylene and ethyl sulfuric acid or ethyl hydrogen sulfate is carried out at a temperature of between 100° C. and 150° C. and within a pressure range of from about 150 pounds per square inch to about 250 pounds per square inch. A highly preferred temperature is from about 125° C. to about 140° C. and a highly preferred pressure range is from about 180 pounds per square inch to about 220 pounds per square inch.

The reaction between diethyl sulfate and sodium lead alloy is generally carried out in an inert solvent which serves to separate the tetraethyllead formed and to moderate the heat of reaction. The temperature is generally carried out at a temperature of from about 70° C. to about 85° C. and at essentially atmospheric pressure. A preferred temperature range is from about 75° C. to about 80° C. The composition of the sodium lead alloy is not highly critical. Generally, the weight percent of the sodium contained within the compound is within a range of from about 9 percent to about 11 percent. Monosodium lead alloy, however, is the preferred compound. The sodium lead alloy can be charged to the ethylator in the form of flakes or in molten form.

The solvent for moderating the heat of reaction and for extraction of the tetraethyllead formed can be an inert hydrocarbon solvent which will dissolve tetraethyllead and will not dissolve sodium ethyl sulfate. A mixed solvent is highly preferred under certain circumstances. Examples of such solvents are hexane, isohexane, octane, isooctane, benzene and mixtures of any of the foregoing.

A preferable solvent for the extraction of sodium ethyl sulfate is any solvent which will dissolve the sodium ethyl sulfate without dissolving or reacting with the lead or the unreacted sodium lead alloy. Alcohols are a preferred class of solvents but other compounds may be used therefor. Ethyl alcohol is a preferred solvent of this class even though it reacts somewhat with oleum to form additional diethyl sulfate. Ethyl chloride and ethyl hydrogen sulfate are also highly preferred solvents. Mixed solvents may also be used for the extraction of sodium ethyl sulfate.

Reaction between sulfuric acid and sodium ethyl sulfate is preferably carried out in solution. Thus, the solvent which is used for the extraction of the sodium ethyl sulfate from the reaction residue is merely contacted with the sulfuric acid. The reaction is carried out at substantially atmospheric pressure. The reaction is carried out at a temperature of from about 50° C. to about 150° C. A preferred temperature range is from about 80° C. to about 110° C.

Having fully described the invention and the preferable modes of operation, I claim:

1. An integrated process for the manufacture of tetraethyllead comprising forming diethyl sulfate by reacting ethylene and a recycled ethyl hydrogen sulfate, as hereafter defined, then reacting said diethyl sulfate with sodium lead alloy and forming a reaction mixture including tetraethyllead, sodium ethyl sulfate and lead, then contacting said mixture with a first selective solvent, for the tetraethyllead, and separating a solution of tetraethyllead in said first solvent, then contacting the so-formed residue with a second selective solvent, for the sodium ethyl sulfate, and separating a solution of sodium ethyl sulfate in said second solvent, then adding sulfuric acid to said solution and reacting with the sodium ethyl sulfate therein and forming sodium sulfate and ethyl hydrogen sulfate, and then recovering the sodium sulfate, and recycling the ethyl hydrogen sulfate.

2. An integrated process for the manufacture of tetraethyllead comprising forming diethyl sulfate by reacting ethylene and a recycled ethyl hydrogen sulfate at a temperature of from about 100° C. to about 150° C. and within a pressure range of about 150 pounds to about 250 pounds per square inch, then reacting said diethyl sulfate with sodium lead alloy at a temperature of from about 70° C. to about 80° C. and at substantially atmospheric pressure and forming thereby a reaction mixture including tetraethyllead, sodium ethyl sulfate, and lead, then contacting said mixture with a first selective solvent, for the tetraethyllead, and separating a solution of tetraethyllead in said first solvent, then contacting the so-formed residue with a second, selective solvent, for the sodium ethyl sulfate, said solvent being selected from the group consisting of ethyl alcohol, ethyl chloride, and ethyl hydrogen sulfate, and separating a solution of sodium ethyl sulfate in said second solvent, then adding sulfuric acid to said solution and reacting with the sodium ethyl sulfate therein at a temperature of about 100° C. to about 130° C., and forming sodium sulfate and ethyl hydrogen sulfate and then recovering the sodium sulfate and recycling the ethyl hydrogen sulfate.

3. The process of claim 1 further defined in that the second selective solvent, for the sodium ethyl sulfate, is ethyl hydrogen sulfate.

4. The process of claim 1 further defined in that the second selective solvent, for the sodium ethyl sulfate, is ethyl alcohol.

5. The process of claim 1 further defined in that the second selective solvent, for the sodium ethyl sulfate, is ethyl chloride.

References Cited in the file of this patent

UNITED STATES PATENTS

| | | |
|---|---|---|
| 1,611,695 | Sullivan et al. | Dec. 21, 1926 |
| 1,749,567 | Daudt | Mar. 4, 1930 |

OTHER REFERENCES

Norris: Experimental Organic Chemistry, 3rd ed., McGraw-Hill, New York, 1933, pp. 21–25.

Fieser et al.: Organic Chemistry, Boston, 1944, p. 122.

Bennett: Concise Chemical and Technical Dictionary, Chemical Publishing Company, Inc., Brooklyn, New York, 1947, p. 850.